(12) United States Patent
Keene et al.

(10) Patent No.: US 10,276,008 B2
(45) Date of Patent: Apr. 30, 2019

(54) SECURITY SYSTEM AND METHOD OF DETECTING CONTRABAND ITEMS

(71) Applicant: METRASENS LIMITED, Malvern, Worcestershire (GB)

(72) Inventors: Mark Nicholas Keene, Malvern (GB); Simon Wray Goodyear, Welland (GB)

(73) Assignee: Metrasens Limited, Malvern, Worcestershire (GB)

( * ) Notice: Subject to any disclaimer, the term of this patent is extended or adjusted under 35 U.S.C. 154(b) by 0 days.

(21) Appl. No.: 15/537,759

(22) PCT Filed: Dec. 16, 2015

(86) PCT No.: PCT/GB2015/054034
§ 371 (c)(1),
(2) Date: Jun. 19, 2017

(87) PCT Pub. No.: WO2016/097724
PCT Pub. Date: Jun. 23, 2016

(65) Prior Publication Data
US 2018/0012465 A1    Jan. 11, 2018

(30) Foreign Application Priority Data

Dec. 18, 2014  (GB) .................................. 1422682.3

(51) Int. Cl.
*G08B 13/14*      (2006.01)
*G08B 13/22*      (2006.01)
*G01V 3/08*       (2006.01)

(52) U.S. Cl.
CPC ............... *G08B 13/22* (2013.01); *G01V 3/08* (2013.01); *G01V 3/087* (2013.01)

(58) Field of Classification Search
CPC ................ G08B 13/22; G08B 13/2474; G08B 13/2471; G08B 13/24; G01V 3/08; G01V 3/087

(Continued)

(56) References Cited

U.S. PATENT DOCUMENTS 3,573,817 A   2/1971 Akers
3,697,972 A   10/1972 Brown
(Continued)

FOREIGN PATENT DOCUMENTS

CN    2172891 Y    7/1994
CN    101383071 A   3/2009
(Continued)

OTHER PUBLICATIONS

International Search Report and Written Opinion of International Application No. PCT/GB2015/054034, dated Mar. 16, 2018, 19 pages.
(Continued)

*Primary Examiner* — John A Tweel, Jr.
(74) *Attorney, Agent, or Firm* — Maine Cernota & Rardin (57) ABSTRACT

A security screening apparatus for use in detecting ferromagnetic objects comprises a detector apparatus which comprises a housing that supports at least one magnetic sensor arranged to produce a signal indicative of an ambient magnetic field or gradient over a zone of sensitivity which extends away from the housing, the size of the zone being large enough to contain the whole body of the person, and a signal processing circuit which receives as an input the signal from the magnetic sensor and which, in response to a change in the signal produces an alert signal. A beacon that comprises a light source is able to emit at least two visually distinct colors of light, and a control means controls the light source such that in a first condition in the absence of the alert signal the beacon emits a first color light and in a second condition corresponding to the presence of the alert signal the beacon emits a second, different, color of light. The light source is arranged such that the position and/or size and/or shape of the illuminated area of the light source in the first condition is different from the position and/or size and or (Continued)

shape of the illuminated area of the light source in the second condition.

12 Claims, 8 Drawing Sheets

(58) Field of Classification Search
USPC ........................................ 340/568.1
See application file for complete search history.

(56) References Cited

U.S. PATENT DOCUMENTS

| | | | |
|---|---|---|---|
| 3,758,849 A | 9/1973 | Susman et al. | |
| 3,763,424 A | 10/1973 | Bennett, Jr. et al. | |
| 3,971,983 A | 7/1976 | Jaquet | |
| 4,024,468 A | 5/1977 | Hirschi | |
| 4,068,164 A | 1/1978 | Schwartz et al. | |
| 4,087,814 A | 5/1978 | Spirig | |
| 4,249,128 A | 2/1981 | Karbowski | |
| 4,334,191 A | 6/1982 | Podhrasky | |
| 4,413,232 A | 11/1983 | Most et al. | |
| 4,467,251 A | 8/1984 | Jonsson | |
| 4,472,908 A | 9/1984 | Wanzl et al. | |
| 4,488,115 A | 12/1984 | Podhrasky | |
| 4,698,937 A | 10/1987 | Kornbrekke et al. | |
| 4,942,360 A | 7/1990 | Candy | |
| 4,962,473 A * | 10/1990 | Crain .................... G08B 25/14 340/539.2 | |
| 5,039,981 A | 8/1991 | Rodriquez | |
| 5,133,829 A | 7/1992 | Geyling | |
| 5,148,151 A | 9/1992 | Podhrasky | |
| 5,345,222 A | 9/1994 | Davies et al. | |
| 5,414,410 A | 5/1995 | Davies et al. | |
| 5,456,718 A | 10/1995 | Szymaitis | |
| 5,959,451 A | 9/1999 | De Torfino | |
| 5,996,281 A | 12/1999 | Takano et al. | |
| 6,150,810 A * | 11/2000 | Roybal .................. G01V 3/087 340/568.1 | |
| 6,308,644 B1 | 10/2001 | Diaz | |
| 6,342,835 B1 | 1/2002 | Nelson-White | |
| 6,541,966 B1 | 4/2003 | Keene | |
| 6,696,947 B1 | 2/2004 | Bybee | |
| 7,113,092 B2 * | 9/2006 | Keene ................... G01V 11/00 340/551 |
| 7,296,683 B1 | 11/2007 | Vallelonga, Sr. et al. | |
| 7,414,404 B2 | 8/2008 | Keene | |
| 7,525,308 B2 | 4/2009 | Tsukada et al. | |
| 7,893,690 B2 | 2/2011 | Simon | |
| 8,450,678 B2 | 5/2013 | Sasaki et al. | |
| 2002/0148965 A1 | 10/2002 | Haufe | |
| 2003/0080868 A1 | 5/2003 | Nelson | |
| 2003/0171669 A1 | 9/2003 | Kopp | |
| 2004/0041084 A1 | 3/2004 | Carlson | |
| 2004/0080315 A1* | 4/2004 | Beevor .................. G01V 3/104 324/244 |
| 2004/0147833 A1 | 7/2004 | Czipott et al. | |
| 2005/0119547 A1 | 6/2005 | Shastri et al. | |
| 2005/0242817 A1 | 11/2005 | Hoult | |
| 2005/0264416 A1 | 12/2005 | Maurer | |
| 2006/0145691 A1 | 7/2006 | Massengill et al. | |
| 2006/0158331 A1 | 7/2006 | Massengill et al. | |
| 2006/0197523 A1 | 9/2006 | Palecki et al. | |
| 2007/0040692 A1 | 2/2007 | Smith et al. | |
| 2007/0052411 A1 | 3/2007 | McClure et al. | |
| 2007/0057786 A1 | 3/2007 | McClure et al. | |
| 2007/0132581 A1 | 6/2007 | Molyneaux et al. | |
| 2007/0133844 A1* | 6/2007 | Waehner ............ G06K 9/00221 382/118 |
| 2007/0182550 A1 | 8/2007 | Castello et al. | |
| 2007/0290843 A1 | 12/2007 | Manneschi | |
| 2007/0296576 A1 | 12/2007 | Holowick | |
| 2008/0001735 A1 | 1/2008 | Tran | |
| 2008/0080178 A1 | 4/2008 | Kita et al. | |
| 2008/0084301 A1 | 4/2008 | Roybal et al. | |
| 2008/0117044 A1 | 5/2008 | Hibbs | |
| 2008/0136631 A1 | 6/2008 | Fluck | |
| 2008/0157965 A1 | 7/2008 | Shahar | |
| 2008/0231443 A1 | 9/2008 | Kotter et al. | |
| 2009/0122547 A1 | 5/2009 | Hou | |
| 2009/0167307 A1 | 7/2009 | Kopp | |
| 2009/0273340 A1 | 11/2009 | Stephanson et al. | |
| 2009/0284405 A1 | 11/2009 | Salmon et al. | |
| 2010/0013461 A1 | 1/2010 | Masubuchi et al. | |
| 2010/0026510 A1 | 2/2010 | Kiani et al. | |
| 2010/0156407 A1 | 6/2010 | Lausch et al. | |
| 2010/0156638 A1 | 6/2010 | McClure et al. | |
| 2010/0315080 A1 | 12/2010 | Duncan et al. | |
| 2010/0319256 A1 | 12/2010 | Agam et al. | |
| 2011/0057788 A1 | 3/2011 | Talkington et al. | |
| 2011/0102597 A1* | 5/2011 | Daly .................... G01S 13/887 348/162 |
| 2011/0172953 A1 | 7/2011 | Kim | |
| 2011/0285390 A1 | 11/2011 | Jewitt et al. | |
| 2012/0038456 A1 | 2/2012 | Pikkarainen et al. | |
| 2012/0074943 A1 | 3/2012 | MacLeod et al. | |
| 2013/0187788 A1 | 7/2013 | Salter | |
| 2013/0229518 A1 | 9/2013 | Reed et al. | |
| 2013/0307533 A1 | 11/2013 | Keene et al. | |
| 2014/0232382 A1 | 8/2014 | Goodyear et al. | |
| 2014/0248833 A1 | 9/2014 | Royle et al. | |

FOREIGN PATENT DOCUMENTS

| | | |
|---|---|---|
| CN | 102682553 A | 3/2012 |
| EP | 0097139 A2 | 12/1983 |
| JP | 2008249584 A | 10/2008 |
| WO | 03069230 A2 | 8/2003 |
| WO | 2008028487 A1 | 3/2008 |
| WO | 2011086369 A1 | 7/2011 |
| WO | 2012022971 A2 | 2/2012 |
| WO | 2014064429 A2 | 5/2014 |

OTHER PUBLICATIONS

Search Report under Section 17(5) of Great Britain Application No. GB1422682.3, Claims 1-11, dated Mar. 12, 2015, 4 pages.
Search Report under Section 17(6) of Great Britain Application No. GB1422682.3, Claims 12-24, dated Aug. 11, 2015, 2 pages.
Search Report under Section 17(6) of Great Britain Application No. GB1422682.3, Claims 25-33, dated Aug. 11, 2015, 2 pages.
Search Report under Section 17(6) of Great Britain Application No. GB1422682.3, Claims 34-39, dated Aug. 11, 2015, 2 pages.
Office Action of CN Appl No. CN2172891 dated Aug. 9, 2018.

* cited by examiner

SECURITY SYSTEM AND METHOD OF DETECTING CONTRABAND ITEMS

RELATED APPLICATIONS

This application is a national phase application filed under 35 USC § 371 of PCT Application No. PCT/GB2015/054034 with an International filing date of Dec. 16, 2015, which claims priority of GB Patent Application GB1422682.3 filed Dec. 18, 2014. Each of these applications is herein incorporated by reference in its entirety for all purposes.

FIELD OF THE INVENTION

This invention relates to apparatus for detecting ferrous metal items, and in particular but not exclusively to a security systems for use in detecting contraband items. In particular in some embodiments it relates to apparatus especially suitable for use in searching for contraband items such as mobile telephones within confined environments such as prisons.

BACKGROUND OF THE INVENTION

The possession of contraband items in prisons is widely recognised as a major risk to safety, either of the inmates, the prison staff or to persons outside of the prison. In the context of this application contraband is defined as any item which the inmate should not have in their possession and which may be used to cause harm or place a person at risk. Contraband includes knives, shanks, guns and other weapons, many of which contain metal or magnetic parts. Cell phones are considered to be contraband and to be dangerous because the can be used by inmates to arrange violent acts inside or outside of the prison, or used to conduct other criminal activities.

Archway metal detectors, AMDs, are commonly used in prisons. They require permanent installation at locations where the environment is conducive to their operation. Their main limitation is that they are permanently installed. Also, AMDs cannot be used next to large amounts of metal which severely limits where they can be installed within the metal-rich prison environment.

Hand held metal detectors, often called hand wands, have widespread use in prisons. They are inexpensive, highly portable, and can be carried into cell blocks by prison staff and used to search inmates, bedding, laundry etc. Their main drawback is their limited range. Because of this they are ineffective for internally carried phones.

SUMMARY OF THE INVENTION

Ferromagnetic detectors, FMDS, which form the basis of the present invention, work by a different principle to conventional metal detectors. They do not transmit anything to evoke a response. Rather they passively detect the magnetic field that naturally surrounds objects that contain iron or other ferromagnetic elements. Ferromagnetic detectors are therefore insensitive to non-ferromagnetic materials such as Aluminium, copper, lead etc. Neither can they detect non-metals. FMDS typically comprise one or more passive magnetic sensors that sense the ambient magnetic field up to a frequency of typically a few Hz. Measured fluctuations of the field are detected using a detection circuit, the output of which activates a warning device.

A magnetic sensor may be considered, for the purpose of this description, to have a zone of sensitivity within which it can reliably detect an object although this is not rigorously accurate. In reality magnetic objects have an external magnetic field that decays rapidly in all directions away from the object. The object can be detected when it is close enough to a magnetic sensor that its field exceeds the detection resolution of the sensor. The extent of the detection zone around a magnetic sensor therefore depends upon its resolution and the target's strength. E.g. the detection zone for a car may be within 25 feet of a fluxgate sensor, say, whereas the detection zone for a small needle may be 6 inches. In general, for prison contraband items such as phones and small knives the detection zone is typically 4-5 feet. For this description it is reasonable to think that the term a detection zone refers to the ability of the device to have a functional range of 4-5 feet from each sensor in the FMDS outside of which contraband objects will not be detected, and within which they will.

This invention in at least one aspect is for a novel security screening apparatus for detecting and locating, in particular, cell phones. In particular it addresses significant gaps in the capabilities of archway and hand-held metal detectors for this application. It provides a highly increased effectiveness at cell phone detection over these traditional detection means.

According to a first aspect the invention may provide a security screening apparatus for use in detecting ferromagnetic objects, for example contraband items such as mobile phones, comprising:

a detector apparatus which comprises a housing that supports at least one magnetic sensor arranged to produce a signal indicative of an ambient magnetic field or gradient over a zone of sensitivity which extends away from the housing, the size of the zone being large enough to contain the whole body of the person, and a signal processing circuit which receives as an input the signal from the magnetic sensor and which, in response to a change in the signal produces an alert signal; a beacon that comprises a light source that in use is able to emit at least two visually distinct colours of light, and a control means which controls the light source such that in a first condition in the absence of the alert signal the beacon emits a first colour light and in a second condition corresponding to the presence of the alert signal the beacon emits a second, different, colour of light, and characterised in that the light source is arranged such that the position and/or size and/or shape of the illuminated area of the light source in the first condition is different from the position and/or size and or shape of the illuminated area of the light source in the second condition.

The beacon may be arranged so that the centre of illumination may shift as the colour changes from the first condition to the second and vice versa.

The beacon may be arranged so that the boundary of the area of illumination may shift as the colour changes from the first condition to the second and vice versa.

By the term perceived centre of illumination of the light we mean the centre point from which a person viewing the beacon from a distance will perceive the light to be emitted from is different for each of the first and second conditions. Thus, not only will the light emitted change colour it will be perceived to have moved as it changes from one condition, one colour, to the other.

By change in area, we mean that the user sees a larger light source when in one condition compared with the other, and so perceives the boundary to move.

Similarly, when the shape changes the boundaries of at least part of the shape will be perceived to have moved.

The applicant has appreciated that when an alert beacon is located in a viewer's peripheral vision, the shift of the position of the light is easily noticed, whereas a change in colour alone may not be as easily noticed. This takes advantage of a person's sensitivity to movement of objects in the peripheral vision. Combining this shift with a change in colour has been found to significantly increase the ease of noticing an alert and provide a screening apparatus which can be located in the area of a person's peripheral vision.

The warning beacon may be arranged so that a person can view the light that is emitted in the first condition and the light that is emitted in the second condition over a 360 angle of visibility in a horizontal plane. By this we mean that they can tell which colour light is being emitted wherever they are viewing from, to the front, side or back.

The beacon may change between two or more visual states, for example between two or more different colours.

It is most preferred that the beacon is in the first condition corresponding to no alert at all times when it is switched on, to show that it is ready to detect an object. It may emit green light in this condition.

The light source may comprise one or more single colour, or one or more bicolour, or one or more tricolour LEDs, or a mix of single, bicolour and tricolour LEDS.

The apparatus may include a drive circuit that receives the alert signal and produces an appropriate drive signal for the light source. This may be located at the beacon or remote from the beacon.

The beacon most preferably comprises two sets of single colour LEDs, each set of a different colour to the other set, that are spread in an array such that the 'centre of illumination' for each colour is at a different location when the LEDs of a set are illuminated.

The two colours may comprise green hue and a red hue. A third colour for a third condition may comprise an amber hue.

There may be four or six or more red lights arranged, for example, in an array such as a 2×2 by 3×2 regular grid pattern. Similarly there may be four or six or more green lights, also arranged is a regular grid pattern and offset from the red lights.

In an alternative to separate red and green lights, the beacon may include one or more bicolour or tricolour lights. The drive circuit may vary the colour output by each light as required. To obtain the perception of movement, one or more of these lights may be illuminated in the first condition and not illuminated in the second condition.

The amount of movement may be limited to at most 20-30 mm, and may be less, perhaps as low as 2-3 mm of perceived movement.

In a typical use of the screening apparatus during screening a line of people, such as prison inmates, the officers conducting the operation need to visually observe three things. They need to watch the line of people waiting to be screened to observe any unusual or disorderly behaviour. They need to observe the person who is being screened to ensure they are not avoiding the system or acting unusually to avoid full screening. Thirdly they need to watch the beacon to see the response of the lights. It is not always convenient to have an audible alert for some types of operation so the visual indicator is essential.

Because the beacon can be monitored in the peripheral vision, an officer can look at other things yet register changes in the alert state.

According to a second aspect the invention may therefore comprise a security screening installation comprising a screening zone within which a person or object is to be screened and a security screening apparatus according to the first aspect in which the detector apparatus is offset from the screening zone such that the zone of detection covers the screening zone and an operating zone in which a person who is operating the device is positioned so that when they are viewing the screening zone they have the beacon of the detector apparatus in their peripheral vision.

The operating zone may be located on a first side of the screening zone and people and objects to be screened may be located on an opposing side of the screening zone and moving through the screening zone towards the operating zone, the beacon of the detector apparatus being located in a region of the peripheral vision of a person located in the operating zone viewing a person moving towards them through the screening zone.

The screening zone may be located between opposing side walls of a corridor or room or between two spaced apart barriers, the detector apparatus being located on one of the walls or barriers.

Whilst in the above arrangement it is beneficial to provide a maximum visibility of a warning to a person who is carrying out a screening operation, there are some instances in which it is beneficial for the alert to be covert.

According to a third aspect the invention provides a security screening system comprising:

a detector apparatus which comprises at least one magnetic sensor arranged to produce a signal indicative of an ambient magnetic field or gradient over a zone of sensitivity around the sensor, the zone being large enough to contain the whole body of the person, and a signal processing circuit which receives as an input the signal from the magnetic sensor and which, in response to a change in the signal produces an alert signal;

characterised in that the detector apparatus includes a transmitter that transmits a non-visible and non-audible warning signal when the alert signal is produced, and further comprising:

a remote warning device that is physically separate from the detector apparatus and comprises a receiver that is responsive to the transmitted warning signal issued by the detector module and generates a remote alert signal when the warning signal is received, whereby the alert signal can be associated with a person or object in the detection zone of the apparatus.

The detector apparatus may include a beacon that is switchable between an inactive state in which the beacon does not respond to the alert signal and an active state in which the beacon responds by generating an audible, visible or audio/visual warning signal. The beacon may be fixed to the detector apparatus and easily visible.

In a preferred arrangement the beacon may be switched to the inactive state whilst the remote warning device is active, so that a person observing the security screening system (listening and/or watching the system) is fooled into thinking that it is not operating or has not detected anything.

The beacon may have two states, one to indicate that nothing has been detected, and the other to indicate that something has been detected. When active it may indicate nothing has been detected even if it has, leaving the remote device to flag up a detection of an object.

The transmitted signal may comprise an electromagnetic or ultrasonic or infra-red signal. In each case it will be inaudible and invisible to an observer. It may comprise a signal that is not detectable by the receiver of a mobile phone, including any Bluetooth detector that may be located in a mobile phone. This ensures that a person cannot "listen in" to the signal using a contraband mobile phone.

The transmission may have a relatively short range so that it will alert a nearby guard who is carrying or wearing the remote device, but cannot be detected. In this case it is important for the person with the remote device to be sure they are within the limited range. The range of transmission may be limited to at most 2 meters, or 3 meter or perhaps 4 meters.

The remote alert device may be a transducer that vibrates when the alert signal is generated to generate a haptic signal.

In this case the receiver and the transducer of the remote warning device may be located within or otherwise supported by a housing that is small enough to be concealed in an adult hand, or small enough to be hidden in a pocket of an item of clothing or hung around a neck on a chain or worn on a band such as a wrist or ankle band.

This means that in a least one embodiment the housing has a maximum of 10 cm in any dimension (width, height, depth) or a maximum of 5 cm in any dimension.

Alternatively, the transmission may be long range to alert a distant guard such as one in a non-local control room. In this case, the remote device need not be small and portable as it need not be hidden about a person, e.g. the guard.

In this case system may comprise a plurality of a detector apparatus, each of which comprises at least one magnetic sensor arranged to produce a signal indicative of an ambient magnetic field or gradient over a zone of sensitivity around the sensor, the zone being large enough to contain the whole body of the person, and a signal processing circuit which receives as an input the signal from the magnetic sensor and which, in response to a change in the signal produces an alert signal;

And in which each detector apparatus includes a transmitter that transmits a non-visible and non-audible warning signal when the alert signal is produced, and further comprising:

at least one camera that captures images of the area including the detector apparatus or a region adjacent the apparatus in which a person approaching, within or having passed through the zone of sensitivity may be located, At least one display monitor on which the images captured by the camera can be displayed, and A controller that is responsive to the remote alert signal to cause the image from the camera associated with the detector apparatus that has generated the alert to be displayed on the monitor.

The system may include a camera for each detector apparatus, each camera capturing an image of a region adjacent the apparatus in which a person approaching, within or having passed through the zone of sensitivity may be located. Thus, if an alarm is triggered because a person is carrying a contraband item they will visible in the camera image.

The monitor may only display images from apparatus that have issued an alert signal, with others not displayed.

Displaying images on a monitor which may be located in a control room allows an operator to identify a person who has triggered an alert from a remote location, even where there are multiple detector apparatus in use at any given time.

The camera may comprise a video camera and the camera and monitor may form part of closed circuit television security system.

There may be a single monitor on which images are displayed. For instance, an image from each camera may be displayed as part of a repeating sequence of images from each camera.

Alternatively, there may be one monitor for each detector apparatus, so that images from the camera from each detector apparatus are displayed simultaneously on the monitors. When an alert signal is received an indicator may be presented in or alongside the image—for instance a red border, or a flashing icon. Alternatively an audible alert may be issued to tell the operator which monitor to view.

The remote warning device may be physically separate from the detector apparatus and comprises a receiver that is responsive to the transmitted warning signal issued by the detector module and generates a remote alert signal when the warning signal is received, whereby the alert signal can be associated with a person or object in the detection zone of the apparatus.

In one arrangement, where at least one camera and monitor is provided, it may be convenient if the means for the detection apparatus to transmit an alert signal to the control room was via the CCTV system, i.e. across the network that transmits the camera information to the monitor.

Thus, the alert signal that is transmitted may be encoded in the picture of audio signal sent from the camera to the monitor.

For example, some solid state CCTV cameras have sensitivity to the near infra-red. The detector apparatus may include a visual warning beacon that may include infrared LEDs to be lit if there is a detection rather than the visible LEDs. These would be visible on the CCTV display screen but not to the people being screened.

Alternatively, the audible alert of the detection apparatus may be near-ultrasonic, i.e. 20-22 kHz, which is just beyond the maximum hearing range for a human. Associated with each detector apparatus may be a microphone that can hear such an alert signal. CCTV cameras, for example, typically include microphones that can usually receive up to 22 kHz, so the alert will be relayed through the audio channel of the CCTV to the control room.

A controller may be provided in the control room to receive and lower the audible frequency and re-broadcast as an audible signal, or use this as a trigger to produce another form of remote alert as described above, because the signal would be beyond the hearing range of the person monitoring.

The apparatus may include more than one remote warning device, each comprising a housing that houses a receiver that is responsive to the warning signal issued by the detector module and generates a remote alert signal when the warning signal is received, and a transducer that produces a tactile signal in response to the remote alert signal.

Where there are a plurality of receivers several guards may be covertly alerted simultaneously. Alternatively the apparatus may include a means on indicating the alert in multiple control rooms, or a combination of any of these means to provide covert alerting to multiple destinations.

Whilst ferromagnetic screening apparatus work very well in detecting contraband, problems can sometimes arise if they are to be used in an environment where there are lots of ferromagnetic objects that might cause false alarms. A typical example would be road vehicles, trains and elevators which are a strong magnetic source. To allow effective screening it may be desirable to use a detector apparatus in a location near to such a source. The movement of the objects causes problems as it prevents them from being effectively compensated for by the sensor output because they do not represent a constant level of background noise.

In another aspect, the applicant proposes a system which may help ameliorate the possible problems with the use of a ferromagnetic detector apparatus for screening in areas where there a strongly magnetic moving background objects which could cause false alarms.

According to a still further aspect the invention provides a security screening installation system comprising:

A first detector apparatus which comprises a first elongate housing that supports at least one magnetic sensor arranged to produce a signal indicative of an ambient magnetic field or gradient over a first zone of sensitivity around the sensor, and a signal processing circuit which receives as an input the signal from the magnetic sensor and which, in response to a change in the signal produces a first alert signal;

A second detector apparatus which includes a second elongate housing that supports at least one magnetic sensor arranged to produce a signal indicative of an ambient magnetic field or gradient over a second zone of sensitivity around the sensor, and a signal processing circuit which receives as an input the signal from the magnetic sensor and which, in response to a change in the signal produces a second alert signal; Whereby in use the first and second detector apparatus are located at predetermined spaced locations such that an object cannot pass between them without being detected in the zone of sensitivity of at least one of the two detectors.

By providing two adjacent detector apparatus, each of which is able to operate independent of the other, and locating them at spaced locations there is a defined region between them through which a person or object must pass for screening. Forcing the person or object to pass through a clearly defined region makes it much harder to avoid detection.

The security screening installation system may include positioning means for setting the relative spaced locations of the two detector apparatus at the correct distance.

The positioning means may comprise a connecting beam which connects the two housings of the detector apparatus together at the correct predetermined spaced locations.

The connecting beam may fix the housings at a set distance apart so as to define a passage between the housings through which a person may pass, the spacing between the housings being chosen to ensure that the first and second zones meet or overlap each other between the housings.

The connecting beam may connect the two housings at a point that is spaced above the ground to form an archway bounded on the sides by the detector housings and at the top by the cross beam.

Alternatively, the positioning means may comprise a template onto which the detector apparatus are placed. It may comprise an instruction document stating what distance should be used. This could be in the form of a printed document or may be printed or otherwise marked on one or both of the detector apparatus.

The positioning means may include a position sensor which measures the spacing between the detector apparatus, and provides an audible or visual indication that the correct spacing has been set. For instance this may be a range finder that may be built into one of the detector apparatus or otherwise secured to it, the range finder determining the distance to the other detector apparatus.

The sensitivity of each magnetic sensor, which determines the size of the screening zone, may be chosen such that an object that has a lowest magnetic field strength that the screening installation is to detect will be detected by the first detector apparatus when it is closer to the housing of that apparatus than to the housing of the second detector apparatus or exactly halfway between the detector apparatus, but will not be detected by the first detector apparatus if it is closer to the other detector apparatus.

Essentially, when configuring two detector apparatus as a single portal, the sensitivity of each detector apparatus can be reduced in order to cover half of the portal width each, thus achieving the same efficacy as a single detector would need to detect over the same area. Because the detection zones are halved, the effect of external interference from large distant ferromagnetic objects are also halved.

Each detector apparatus may be provided with a means for adjusting the sensitivity of the detector apparatus and hence the size of the detection zone. The means may enable the sensitivity to pre-set at a value that is matched to the length of the cross beam. For instance, it may include a button or switch that sets the sensitivity at the required value.

The cross beam may carry information telling an operator what setting to use for that beam. For instance, a longer beam may need a higher sensitivity for each detector apparatus.

Each of the detector apparatus may function independently as a stand-alone screening apparatus that produces a respective alert when an object passes. Each may therefore include its own signal processing circuit and its own visible or audible alarm that is activated by the alarm signal. Each may have its own housing that is separate from the housing of the other.

Unlike an archway metal detector, which has a transmit side and a receive side and can only be used as an archway, the present invention allows a flexible and high value design that can be used as an archway or as two independent ferromagnetic detectors. The cross beam may therefore be removable from one or both detector apparatus, or may be separable into two parts with one part secured to each detector apparatus, for when independent use is required.

Each detector apparatus may be powered independently of the other, for instance by batteries that may form part of the apparatus or by connection to a supply of mains electrical power, typically 110 v or 230 volts.

In a modification, the two detector apparatus need not be independent. For example, each housing may support a magnetic sensor by a common signal processing circuit may be used. The alert signal associated with each magnetic sensor may be passed to a common visible or audible alarm.

The detection zones of each device may overlap by an amount although for minimising sensitivity the zone of each device may extend across the gap between housings but not sufficiently far that the zone encompasses the other housing.

In another aspect the invention provides a kit of parts for use in constructing a security screening installation of the above aspect, the kit comprising a conversion part that includes a connecting beam, the conversion part securing two detector apparatuses.

The cross beam may be secured at the top of the two housings or at the bottom as a threshold. It may have a fixing at one end for fixing to a housing of a first detector apparatus and a fixing at the other end for fixing to a second detector apparatus.

The cross beam may be flexible or rigid, but is preferably inextensible to set the correct spacing between the two detector apparatuses.

The kit may include a pair of bases that support the elongate housings in an upright position. The pair of bases may be interconnected, or separate.

The connecting beam or cross piece may have a length of between 30 cm and 100 cm, but may be longer.

Whilst the archway arrangement has advantages in reducing the effect of unwanted background noise, it also has the advantage that anyone passing through the archway will be effectively screened. A disadvantage of the use of hand wands or single pole FMDS is that a person may pass by whilst just being outside of the detection zone, and therefore able to move with a contraband item undetected. When there are lots of people being screened it may be hard for an operator to be sure a person has passed by the apparatus in the zone of sensitivity or just outside of this. A person trying to pass undetected would attempt to be as closed as possible, yet outside of range, so as to trick the operator into thinking they passed through the zone.

Increasing the sensitivity of the device would help by making the zone larger, but as explained in the context of the archway this is not practical in many instances as it would lead to lots of false alarms due to background objects, or limit areas in which screening can take place. A barrier may be used to ensure a person must pass by within the detection range, such as a wall or movable screen, but this is not always practical.

Therefore according to a further aspect the invention provides a security screening installation system comprising:

a detector apparatus which comprises at least one magnetic sensor arranged to produce a signal indicative of an ambient magnetic field or gradient over a zone of sensitivity around the sensor, the zone being large enough to contain the whole body of the person, and a signal processing circuit which receives as an input the signal from the magnetic sensor and which, in response to a change in the signal produces an alert signal; and which further includes a range determining means arranged to detect when an object is located in a defined range of distances bounded by a defined minimum distance from the magnetic sensor and a defined maximum distance from the magnetic sensor, and a processing means which produces a warning signal indicative that a person may be trying to avoid detection of an object if the range determining means indicates that an object has been detected that is within the defined range.

The minimum distance of the range may correspond to the edge of the zone of sensitivity such that an object that is located within the zone of sensitivity does not generate a warning signal as it is outside of the range.

By providing an apparatus with an additional range determining sensor, the output of which is used to provide a warning signal if reliable ferromagnetic screening in the zone of sensitivity is being avoided by people or objects passing too far away from it, an increased ease of use can be obtained. A person avoiding detection can be identified and made to go past again at a closer distance, or taken aside for closer checking.

It should be appreciated that a person or object may be carrying a ferromagnetic object on the side furthest from the detection apparatus. It is important that the ferromagnetic object passes within the zone of ferromagnetic detection or it may not be reliably detected. The range detection means will not be specific to ferromagnetic objects and will generally record the distance between the nearest point of the person or object and the sensor apparatus. The minimum distance of the range within which a warning signal is generated should therefore correspond to a distance whereby if the closest point of the person or object passes within that distance then it is expected the whole of the person or object is within the zone of reliable ferromagnetic detection.

The maximum of the distance of the range within which a warning signal is generated may be any distance deemed to be outside of which screening is not expected to occur.

For convenience this may be close to the zone of reliable ferromagnetic detection or slightly less.

The range determining means may comprise an optical range sensor that emits and receives light in the visible or infra-red spectrum.

Alternatively, or additionally, the range determining means may comprise an ultrasonic or radar based range finder.

The range determining means may produce a variable output signal that has a value dependent on the range, the boundaries of the range being set by detecting when the value is within a defined range of values.

To determine when an object is in range, the output signal may be fed into a first comparator and compared with a first reference signal, and to a second comparator and compared with a second, different, reference signal, the two outputs of the comparators being input to an exclusive OR gate, the output of which defines the warning signal. As an alternative, the output of one comparator may be inverted and the two comparator outputs passed through an AND gate. Of course, the skilled person will appreciate that other logic circuits can be used to the same end.

The two outputs from the comparators may also be fed into a sequence filter. This filter is a refinement to prevent the momentary activation of the alert as the person or object enters the zone maximum and before they pass the zone minimum. By observing the sequence of events from the two comparators this is straightforward to achieve.

The alert signal and the warning signal may therefore be input to a processing means which outputs an alarm signal that is used to control or drive an audible or visible or haptic alarm (or a combination of two or more of those things) when certain logical conditions are met.

The processing of the signals may be performed in the analogue or digital domain, and as such the warning signal, alarm signal and any output signals or intermediate signals formed by the processing means may be analogue or digital.

The conditions for an alarm signal to be generated may be as set out in the following table:

| Input conditions | | | Output states | | |
|---|---|---|---|---|---|
| R > R1 | R1 > R > R2 | R2 > R | Magnetic detected | Avoidance detected alert | Main Alert |
| ✓ | x | x | x | x | x |
|  |  |  | ✓ | x | x |
| x | ✓ | x | x | ✓ | x |
|  |  |  | ✓ | ✓ | ✓ |
| x | x | ✓ | x | x | x |
|  |  |  | ✓ | x | ✓ |

Where R is the distance measured by the range finder;

R1 is the maximum distance of the range; typically near the edge of the zone of reliable ferromagnetic sensitivity or less i.e. 40-100 cm; and R2 is the minimum distance of the range corresponding typically to the maximum range where a person or object is expected to be reliable screened (Typically 10-25 cm).

The alarm signal that is used to inform an operator that a magnetic object has been detected or a person is trying to avoid detection alerting an operator to the presence of a magnetic object, may comprise an audible or visible or haptic (or combination of two or more things) that may be issued when the logic indicates that the object has passed by outside of the zone of sensitivity but within the range of the additional sensor, which will indicate a possible attempt to avoid detection.

The output of the comparator that indicates that an object is located closer than the minimum range may be combined with the alert signal using an AND gate so that alarm signals indicating the presence of a ferromagnetic object are only issued if the object is in the zone of sensitivity. This can be used to greatly reduce false alarms.

BRIEF DESCRIPTION OF THE DRAWINGS

There will now be described by way of example only, several embodiments that fall within the scope of one or more of the aspects of the present invention, with reference to and as illustrated in the accompanying drawings of which.

DETAILED DESCRIPTION

Figure 1:
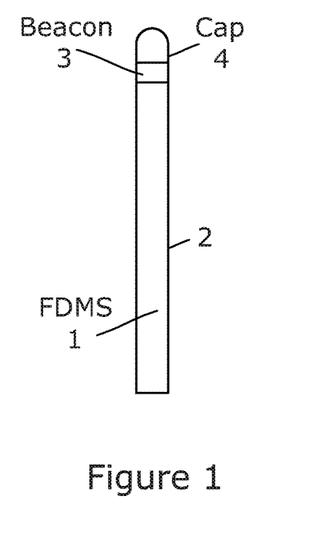
FIG. 1 is a simple front view of a detector apparatus that may form a part of an embodiment of a security screening apparatus according to the present invention.
Figure 4:
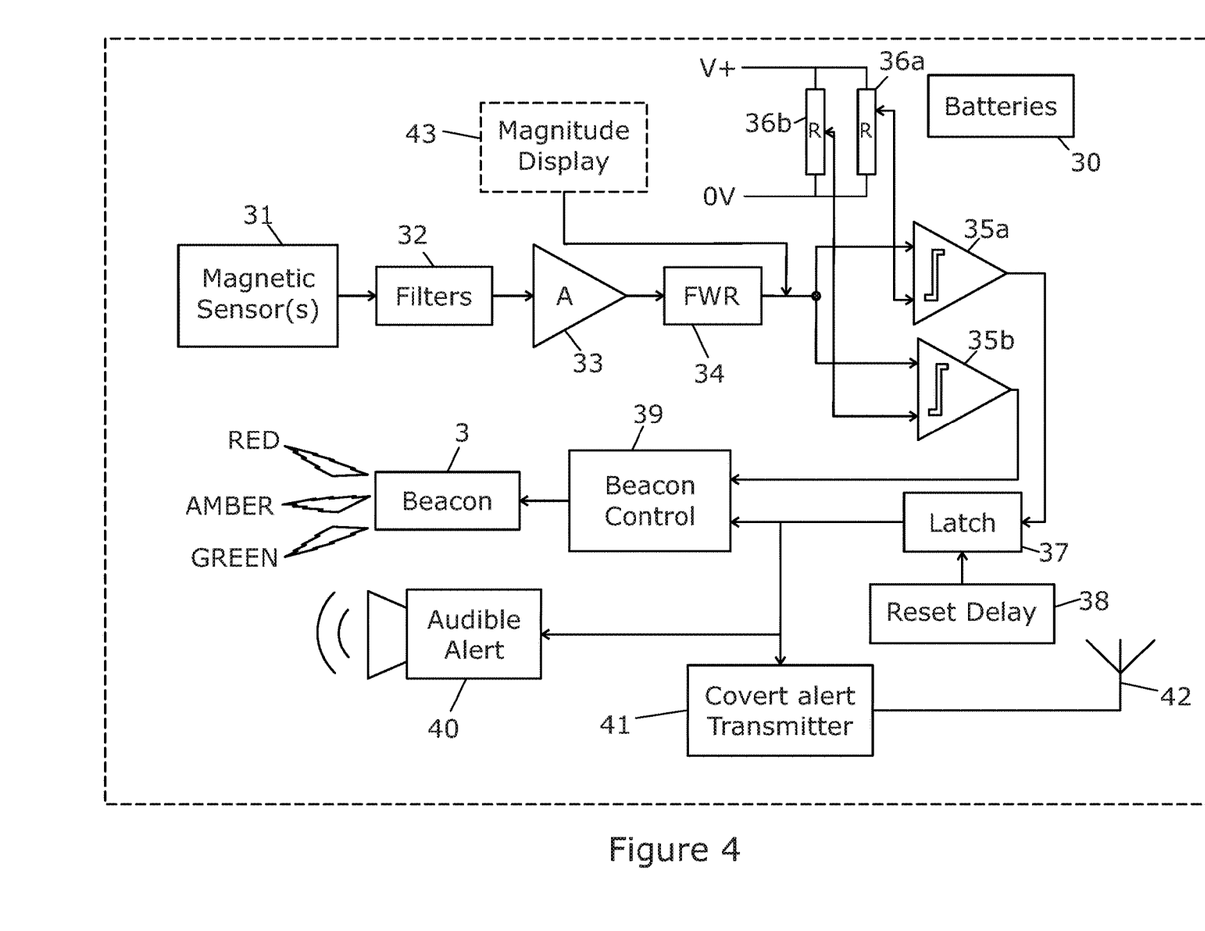
FIG. 4 is a circuit diagram for the detector apparatus of the embodiment of FIG. 1.

FIG. 1 shows a representative detector apparatus 1 that may be used to carry out a method, or form part of a security screening apparatus, of the present invention. FIG. 4 shows the main functional parts detector apparatus in a block diagram.

Figure 2:
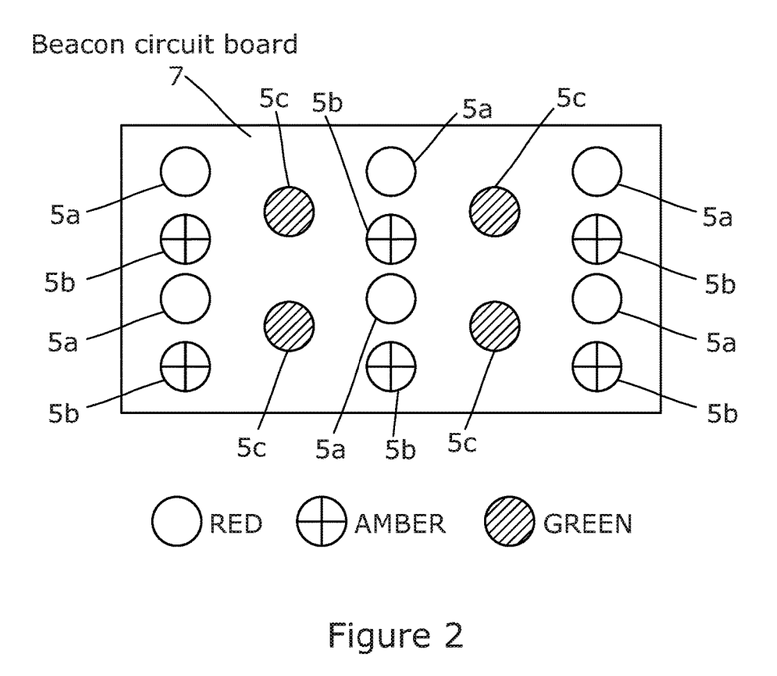
FIG. 2 is a view of one side of the beacon of FIG. 1, the other side being identical or a mirror image.
Figure 3:
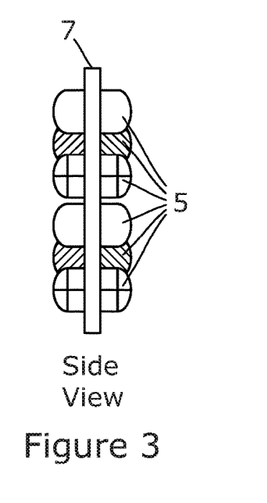
FIG. 3 is a view from the front of the beacon of the detector apparatus of FIG. 1 with the clear plastic cover removed the other side being identical or a mirror image.

The detector apparatus 1 comprise an elongate pole shaped housing 2 made of aluminium or other non-ferrous material, about 6 feet (180 cm) tall and 10 cm wide, which has a base at one end and is capped at the other end 4 with a beacon 3 that is surrounded with a transparent cover to allow the light out. The beacon 3 comprises a set of light emitting diodes 5 which form a visible alarm or beacon as shown in FIGS. 2 and 3. The diodes are red, amber and green and can be illuminated separately so as to provide a red, amber or green glow when in a first, second or third condition. The housing 2 contains all of the sensors and electronic circuitry needed to operate the device and a battery (not shown). The battery provides power to the circuit enabling the apparatus to be self-powered and used away from a mains power source although the device could be mains powered.

Figure 8:
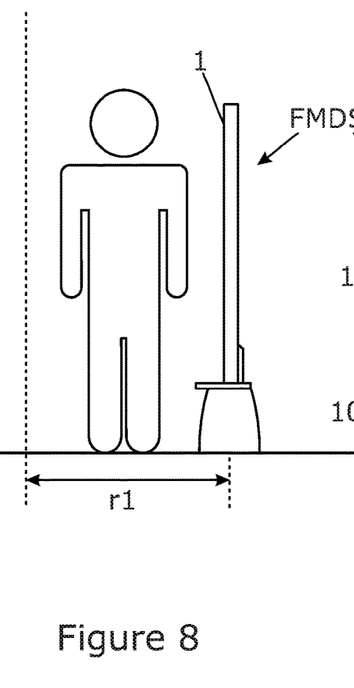
FIG. 8 is a front view of a detector apparatus of FIG. 1 used during a screening operation.

The apparatus is light enough to be carried around easily, and the pole containing the sensors and circuitry can be stored safely in a two part protective case (also not shown). A weighted base, as shown in FIG. 8 may be provided which can be used to hold the pole in an upright position. The pole 2 is ruggedized to protect the circuitry if it is handled roughly or knocked over.

Internally, as shown in FIG. 4, the detector apparatus 1 comprises an electronic circuit powered by the battery 30, or mains power. A magnetic sensor 31 is provided, such as a fluxgate sensor or a magneto-resistive sensor, a magneto-impedance sensor, a Hall Effect sensor, or a galvanic coil sensor, which produces an output signal dependent on the ambient magnetic field at the sensor. In fact, two or more sensors can be used if desired, the increased number of sensors enabling a defined zone of sensitivity to be established. Where only one sensor is provided the zone will extend all around the sensor and be limited only by the intrinsic sensitivity of the sensor, or a lesser sensitivity if desired. The zone of detection for cell phones, blades and other magnetic contraband extends on all sides of the apparatus and is large enough to accommodate the whole of an inmate, perhaps extending for 1 meter from the pole.

When used the apparatus generally remains still. The magnetic sensor 31 will register a largely unchanging magnetic field due to the earth. This constitutes a large offset on the output of the sensor. This constant offset can be removed using a high pass filter. The sensor will also likely measure regular changes in the magnetic field associated with the power supply for electrical equipment located near the detector apparatus which will cause the output to vary at the supply frequency and its harmonics. This can also be filtered out using a low pass filter. The filters collectively constitute a band-pass filter 32 to perform these functions.

It is known that it takes between 0.3 seconds and 3 seconds, typically, for a person to pass through a doorway. The reciprocal of these times defines the frequencies of interest in the output of the sensor 31, i.e. 0.3 to 3 Hz.

If a ferromagnetic object carried, or pulled or pushed, by a person passes close to the sensor 31 through the zone of sensitivity, the ambient magnetic field will be altered causing a change in the output of the magnetic sensor 31. That change will pass through the filter 32 and be amplified by an amplifier 33 to form an alert signal. In order to trigger an alarm the alert signal size is compared with user-settable thresholds. Because the alert signal may be positive or negative, the threshold detector consists of a rectification stage 34 followed by comparators 35a and 35b that has circuits 36a and 36b to provide threshold voltages. Two thresholds, as shown, are necessary for a three colour beacon, for example, one threshold defines the green-amber transition and a higher one defines the amber-red transition. It will be appreciated that only one comparator and threshold are necessary for a two colour beacon. An optional latch 37 may be provided which holds the value of the signal output from a comparator for a predetermined period—perhaps up to 1 second.

The output of the comparators 35a and 35b may be arranged to have logic level zero for the state where the alert signal does not exceed the threshold, and level 'one' for the state when the alert signal has exceeded the threshold. Once an object has passed out of range of the sensor 31 the logic levels return to zero once the signal level has dropped below the thresholds. In practice, it may be preferable that the alert continues for an elapsed time defined by a reset delay 38 and a latch 37 such as a flip-flop that maintains the output or the alert for a fixed time.

The latched alert signal and the output of comparator 35b may be used to determine the condition of the beacon 3 by the beacon control 39. One convenient arrangement is when there is no signal detected the inputs to 39 are both zero and this results in a green light (first condition) at beacon 3. When input A is high (one) and B is zero due to the lower threshold 36b being exceeded, the beacon emits amber light (second condition). When both A and B are high (one) the beacon emits red light (third condition). This way an intuitive traffic light indication is created. It has been found to be beneficial, although not essential, that both a visual 3 and audible alarm 40 are provided. This colour change, and audible alarm, provides an indication of whether contraband is present. It may be beneficial, according to one aspect of this invention that a transmitter 41 is also activated. The latch 37, audible alert 40 and transmitter 41 may alternatively be connected to either of the comparator outputs, 35a or 35b in any combination. Also, any of the alert means (visual, audible or covert transmitter) may be activated or deactivated in any combination. For example, in a further aspect of this invention the visible colour and audible alerts may be deactivated but infrared LEDs in the beacon 3 or ultrasonic sounds from the audible alert 40 may be activated.

Optionally other types of display may be used, for example a signal magnitude indicator 43.

The Beacon is shown in more detail in FIGS. 2 and 3 of the drawings. It comprises a supporting substrate, such as a printed circuit board, onto each side of which is mounted an array of light emitting diodes, each of a single colour. Proving light emitting diodes (leds) on each side enables a full 360 degree visibility of the light to be achieved provided that the diodes or both sides are illuminated at the same time.

The diodes in this example comprises six red leds in a 3 by 2 grid, six amber leds in a 3 by 2 grid with each one offset vertically from the six red leds, and four green leds arranged in a 2 by 2 grid centred between the outermost red and amber leds. The leds are supported by a circuit board 7. All green, or all amber or all red are illuminated at any one time, red being used for issuing a warning or alarm as an object is detected, and the green when there is no object detected. Amber is issued is a low signal that might be an object is detected.

When each colour is lit up, the centre of illumination of the beacon and the shape of the light overall is different to that of the other colours. This gives the perception of movement of the source of the light which has been found to support better visibility in the peripheral vision. The retina of the human eye consists of two types of cells, commonly known as rods and cones. Cones are concentrated around the fovea, and that is where light falls when we are looking directly at something. Cones are sensitive to colour. Rods are more abundant in the periphery of the retina, which is where the light falls from objects that are not in the direct line of sight. Rods are not sensitive to colour, but are highly sensitive to movement and low intensity light. Colour changing by itself is therefore not easily detected by the eye unless it is looking in the general direction of the beacon.

The beacon of the embodiment of FIGS. 2 and 3 gives the appearance of movement as well as changes in colour. The beacon is made from single colour LEDs that are spread in an array such that the 'centre of illumination' for each colour is at a different location.

When the lights of the beacon change colour there is a small associated movement in their position due to the use of a clear plastic surround (rather than a diffuser as has been used in the prior art which disguises the location of each individual LED to give a uniform glow.

There are many arrangements of LEDs by which this may be achieved, and FIGS. 2 and 3 show just one example to illustrate two strategies. Here the beacon is always green, amber or red. When moving between green and amber there is an expansion of the lit area and a small shift downwards in the centre of illumination. Green LEDs are generally brighter than amber or red so there are fewer of them. When going from amber to red, the centre of illumination moves upwards. Although these movements are relatively small, just a few millimeters, it is enough to be clearly visible in the peripheral vision. This effect may be accentuated by invoking flashing or sequence control of the individual leds.

The beacon 3 and audible alert 40 make the screening process highly overt, whereas in some operational scenarios it may be preferable to screen in a covert manner. To achieve this, the beacon 3 and audible alert 40 must be switched off or used in a manner where they are not perceivable to the people being screened. One way to achieve this is to screen from behind a wall. It is unusual for any wall to hinder the detection capability of an FMDS. In order for the operator to be alerted a transmission means 41 is required using a communications means, such as a radio signal, ultrasonic signal or optical signal. This list should not be considered to be an exhaustive list and is merely a list of examples. A receiver is needed that may produce an audible or visible alarm, or perhaps provide a haptic signal to discretely alert an operator. In some arrangements this remote alarm unit could be provided instead of an alarm on the housing.

Figure 5:
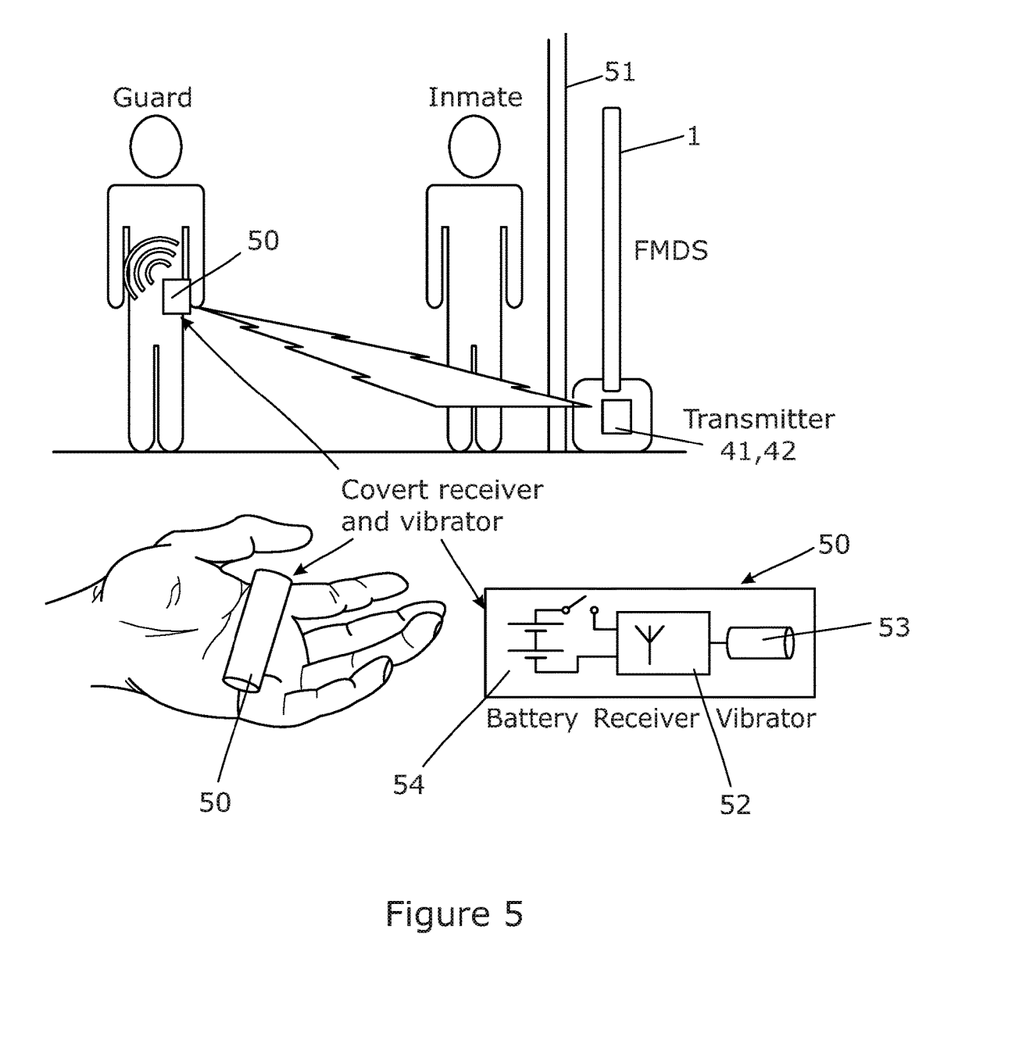
FIG. 5 shows a remote warning device that can be used with a detector apparatus to provide a covert alarm signal when a ferromagnetic object has been detected.

In the example of FIG. 5 the apparatus 1 is behind a wall 51 and transmitter 41 relays the alert signal to a small discrete haptic unit 50 that contains a receiver 52, a vibrator 53 and a battery 54. The transmission means must be capable of penetrating walls and not discernible by non-operators. This excludes the use of systems like Bluetooth where signals can be intercepted on contraband phones and earpieces are easily visible.

Figure 6:
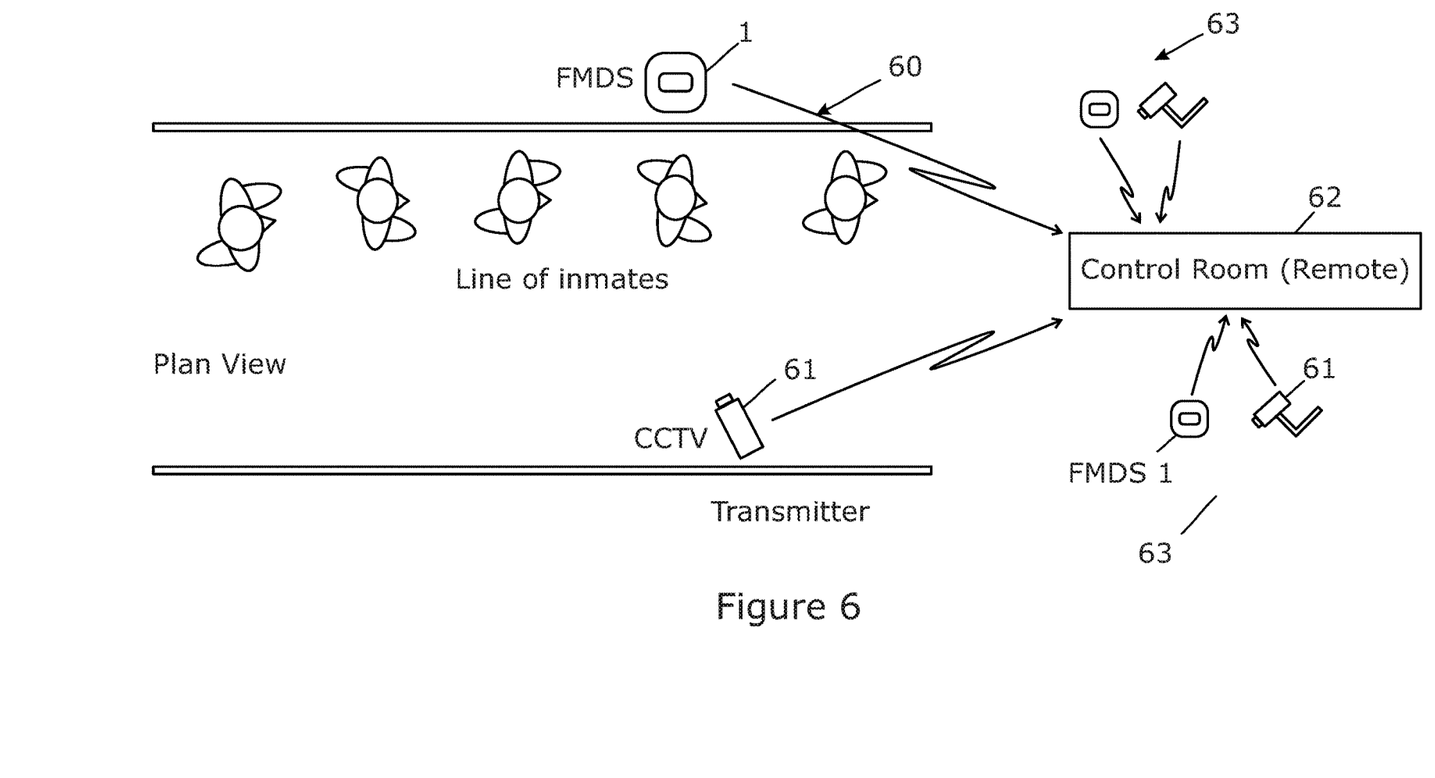
FIG. 6 shows the apparatus with a long range covert alarm signal and a CCTV system screening people covertly.

Alternatively the covert screening may be monitored from a remote control room as shown in FIG. 6. Here the FMDS 1 is behind a wall and the wall is monitored by a CCTV camera 61. The transmitter 41 is long range and its signal 60 is directly received in the control room 62 where an audible or visual alert (not shown) may be given to the controller. The controller is also viewing the scene from the CCTV on a regular monitor. When alerted to the presence of a ferromagnetic object, the operator can observe or record (automatically or otherwise) the image of the person or object that caused the alert. The control room may monitor several other systems 63 simultaneously.

Figure 7:
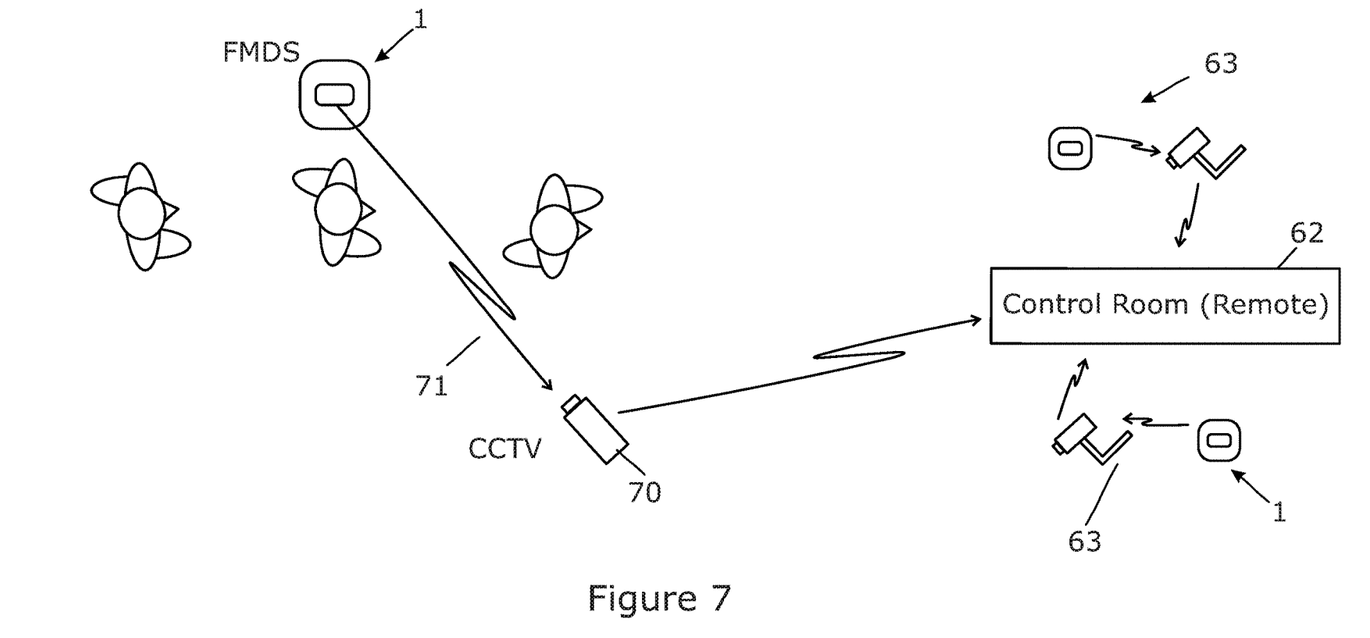
FIG. 7 shows the apparatus with a covert alarm signal operating via a CCTV system or a remote control room.

A variation of this is shown in FIG. 7 where the CCTV camera 70 can receive infrared or ultrasonic emissions 71 from the FMDS 1 via the beacon 3 or audible alert 40. This alleviates the need for a separate transmitter 41. The CCTV relays the alert signal in its image in the case of infrared or audible in the case of ultrasonic. The operator in the control room will see the infrared beacon directly on the image in the CCTV monitor. Alternatively the ultrasonic alert may be heard if an ultrasonic detector is employed. Again, multiple systems 63 may be monitored simultaneously. It should be noted that if an ultrasonic alert signal is given then search canines may be trained to respond.

Figure 9:
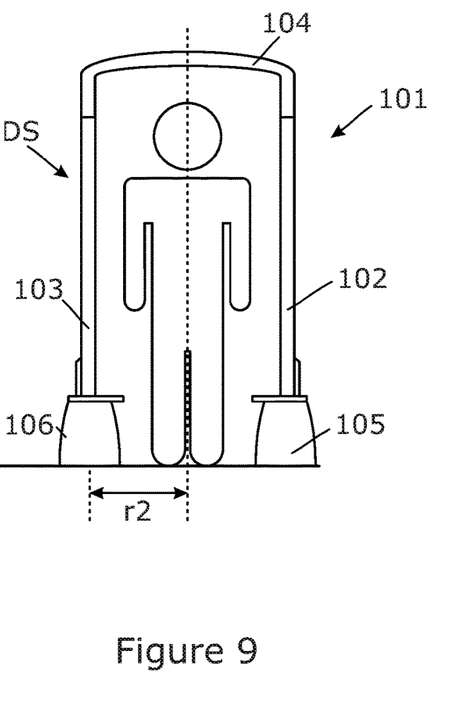
FIG. 9 is a front view of a pair of detector apparatus connected by a cross beam to form an embodiment of a screening apparatus of another aspect of the invention

FIG. 9 shows an alternative arrangement of a security screening apparatus 101 in which two detector apparatus 102,103 such as those of FIGS. 1 to 3, each capable of independently detecting an object, are used together. In particular, each detector apparatus comprises a pole shaped housing and is supported at a lower end in a heavy base 105,106. The two housing are spaced about 1 meters apart, and are connected at the top by a cross beam 104. The cross beam 104 serves two functions. Firstly it helps support the top of the two housings to form a defined archway through which an inmate must pass for screening. Secondly, it defines the spacing between the two housings in a precise manner, ensuring that optimum performance of the detectors is achieved.

By setting the housings a defined distance apart, it is possible to minimise the sensitivity setting for each unit whilst ensuring a high degree of detection for even small objects. To illustrate this a single unit has been shown in FIG. 8 which covers the same detection area as the two poles of FIG. 9.

During normal operation of a single pole as shown in FIG. 8, the detector apparatus has to be sensitive to the phone at a range of r1 in order to be reliably sensitive (where r is the radius of a circular zone of sensitivity that extends out from the pole). The field B1 that a small object such as a mobile phone, produces at the sensors in the pole at distance r1 is $B1=A/r1^3$ where A is a constant depending on the magnetic strength and orientation of the phone.

On the other hand, when there are two detector apparatus as shown in FIG. 9 then the maximum distance that the zone of sensitivity needs to extend from either is r2. It is advantageous for r2 to be a half of r1, (so the FMDS are separated by r1 from each other) in which case the field from the phone at the sensors is $B2=A/r2^3$ or equivalently $B2=8\times A/r1^3$. The signal to be detected is 8 times stronger so the sensitivity can be reduced eightfold, i.e. threshold level in the detector increased eightfold, to achieve the same detection performance.

This eightfold reduction in sensitivity level to achieve the same detection performance as the single unit means that the system is eight times less sensitive to external noise and interference, providing a significant advantage in magnetically noisy environments.

Each detector apparatus 102,103 may be provided with a means for reducing the sensitivity when configured as an archway compared with when it is used on its own, to allow the benefit of the reduced sensitivity to be realised.

Figure 10:
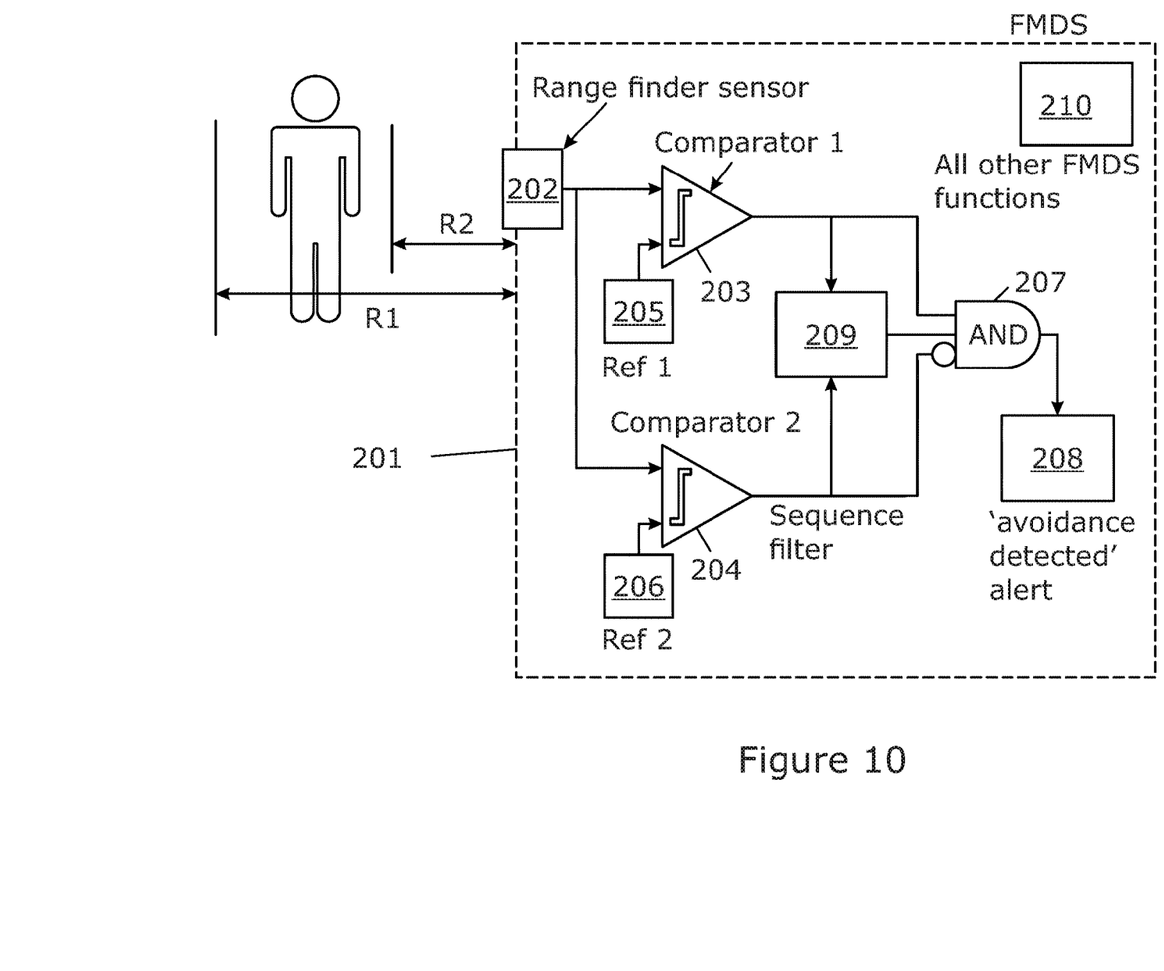
FIG. 10 is a circuit diagram for an alternative embodiment of a screening apparatus according to the invention that includes a range detector to help identify attempts to avoid detection.

In a modification, shown in FIG. 10, a detector apparatus 201 is provided that has the features of the detector apparatus of FIG. 1 but in addition includes a range detection means that enables the detector apparatus to determine when a person passing the detector apparatus may be trying to avoid detection of a contraband item.

The detector apparatus includes a magnetic sensor, band pass filter, amplifier and rectifier of the embodiment of FIGS. 1 and 4 (represented by the block 210).

In addition, the detector apparatus includes a range detection means that comprises a range finder sensor 202 that generates a signal that varies in a known manner as a function of distance to a detected object. In this example a low value is output for an object that is a large distance away and a higher value for a closer object.

The range sensor output may therefore be an analogue voltage that is fed into comparators 203, 204 and compared to a fixed voltage from different references 205, 206. The output of each comparator 203, 204 is low or high depending upon whether the range to the object is below or above a set level defined by its reference signal.

One reference value is set to detect whether a person has passed within a range R1, that is chosen to determine whether a person is actually passing the unit or not. The second reference is set at the shorter range R2, above which a person is deemed to be avoiding the unit. The outputs of the two comparators are fed into a logic means that determines whether the person has passed in-between the ranges R1 and R2, in which case the 'avoidance detected' alert is activated. One of many simple ways to achieve this is with an AND operation with an inverted input as shown in the figure.

In this specific example, the signal from the range finder sensor 202 is fed to one input of a first comparator 203. The other input of the comparator is fed with a reference signal REF 1, 205 that corresponds to a maximum distance of a range within which objects are to be detected. The output of the comparator is low if the signal from the range finder is below REF 1 but goes high if it is above REF 1. This corresponds to a logical YES, that the object is closer than the maximum distance of the range.

The signal is also fed to one input of a second comparator 204. The other input of the second comparator is fed with a reference signal 206, REF 2, that corresponds to a minimum distance of a range within which objects are to be detected. The output of the comparator is low if the signal from the range finder is below REF 2 but goes high if it is above REF 2. This corresponds to a logical YES, that the object is closer than the range minimum.

The two signals are fed to an AND gate 207, the output of the second comparator being inverted first, so that the AND gate produces a logical zero when the object is outside of a range of distances whose maximum and minimum distance is bounded by REF 1 and REF 2 respectively, and a logical one when it is inside the range. As shown the maximum is distance R1 and minimum is distance R2. This logical signal forms a warning signal that a person may be trying to avoid detection.

The minimum distance R2 of the range is chosen such that the outer extremity (point furthest from the FMDS) of a person or object passes within the zone of reliable detection of the magnetic sensor. Thus, if a person passes within the zone with a magnetic object an alert is raised (magnetic object detected) and no avoidance warning is raised (object within range). It is known that the sensitivity of the magnetic sensor to objects in this zone is high enough to reliably detect a contraband object. On the other hand, if a person passes outside of the zone of reliable sensitivity but within the range of the range finder (distance greater than R2 but less than R1) then a warning will be raised (person avoiding detection). If the person passes outside of the maximum range of the range finder (distance greater than R1) then no avoidance alert will be raised as it is assumed that this person is not being screened as they will be obviously avoiding screening and no alert is needed to help spot that. If a magnetic object is detected at this range, no alert will be raised.

The detector apparatus 201 may include a beacon or other alarm 208 that is driven by the warning and alert signals. A different warning/alarm may be issued depending on whether a person is avoiding detection or an object has been detected. A sequence filter 209 is included to avoid the momentary alert signal that is otherwise inevitable when a person or object approaches because they have to come within R1 momentarily before they can come within R2.

Figure 11:
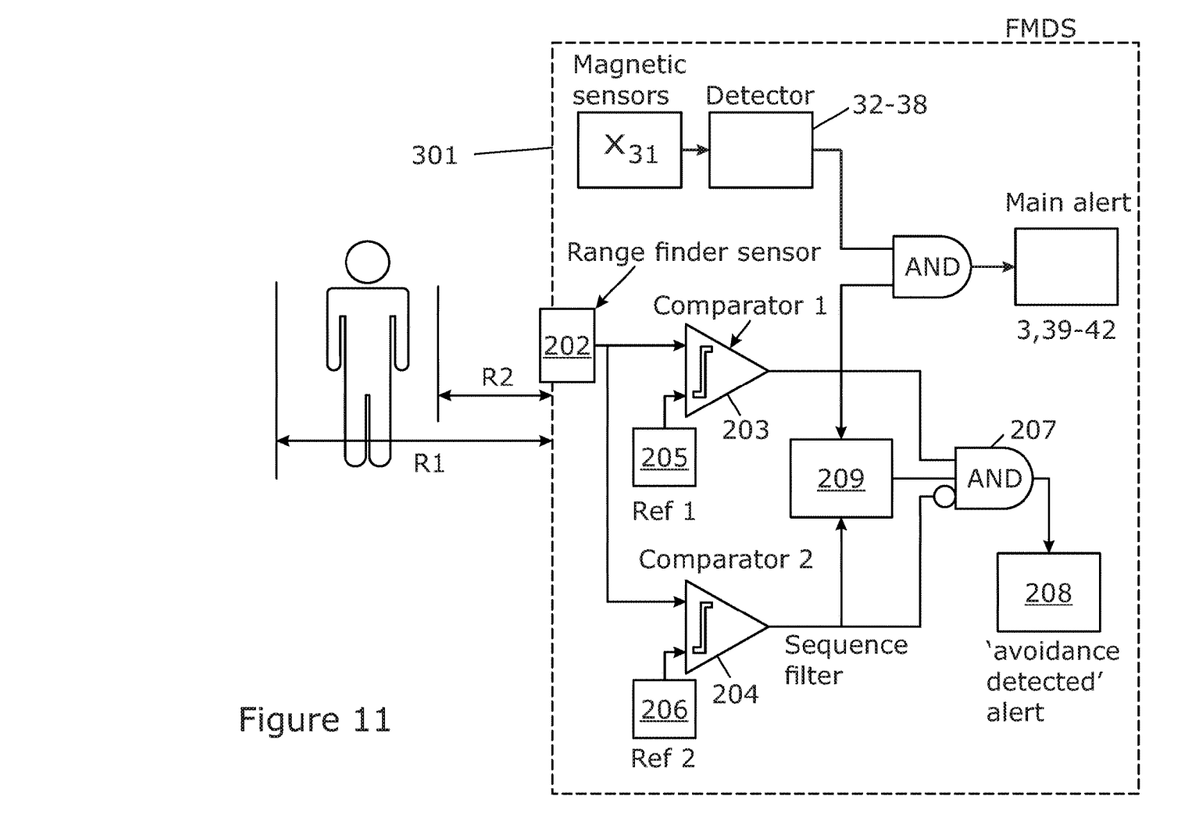
FIG. 11 is a circuit diagram for another alternative embodiment of a screening apparatus according to the invention that includes a range detector to help identify attempts to avoid detection.

In a modification shown in FIG. 11, a detector apparatus 301 may be provided that is similar to the detector apparatus 201 in that it includes a range detector whose output is processed by two comparators to identify when an object is in a bounded range of distances from the magnetic sensor. In this embodiment, the output of the first comparator 203, that indicates if an object is within the zone of sensitivity (distance less than R1), may be processed together with the alert signal generated by the magnetic detector circuit of the detector apparatus using an AND gate or other logical means so that an alarm is only raised if the object is in the zone of sensitivity. This will ensure that no false alarms are raised by objects with a high magnetic field are moving in the vicinity of the detector apparatus such as vehicles, trains, lifts etc. Here, the main alarm sounds if there is a coincidence or correlation between the detected magnetic signal and the indication that a person is passing closer than R1. This desirably eliminates false alerts from strong distant (>R1) magnetic objects moving (e.g. cell doors, vehicles, etc.). If a person carries a magnetic object past that is detected and they are within R1 then the main alarm will sound, even if they pass further than R2. If no magnetic object is detected there is never any main alarm, however if the person passes further than R2 then the 'avoidance detected' alert is given, and that person would be re-scanned.

The complete truth table for the detector apparatus with the range finder is shown below.

| Input conditions | | | Output states | | |
|---|---|---|---|---|---|
| R > R1 | R1 > R > R2 | R2 > R | Magnetic detected | Avoidance detected alert | Main Alert |
| ✓ | x | x | x | x | x |
|  |  |  | ✓ | x | x |
| x | ✓ | x | x | ✓ | x |
|  |  |  | ✓ | ✓ | ✓ |
| x | x | ✓ | x | x | x |
|  |  |  | ✓ | x | ✓ |

The invention claimed is:

1. A security screening system comprising:
   a detector apparatus comprising at least one magnetic sensor arranged to produce a signal indicative of an ambient magnetic field or gradient over a zone of sensitivity around the sensor, the zone being large enough to contain a whole body of a person; and
   a signal processing circuit which receives as an input the signal from the magnetic sensor and which, in response to a change in the signal produces an alert signal;
   characterised in that the detector apparatus includes a transmitter that transmits a non-visible and non-audible warning signal when the alert signal is produced, wherein the warning signal is not detectable by the receiver of a mobile phone, including any Bluetooth detector that may be located in a mobile phone, the system further comprising:
   a remote warning device that is physically separate from the detector apparatus and comprises a receiver that is responsive to the transmitted warning signal issued by the detector module and generates a remote alert signal when the warning signal is received, whereby the alert signal can be associated with a person or object in the detection zone of the apparatus.

2. The security screening system according to claim 1 wherein the detector apparatus includes a beacon that is switchable between an inactive state in which the beacon does not respond to the alert signal and an active state in which the beacon responds by generating an audible, visible or audio/visual warning signal configured so that the beacon may be switched to the inactive state whilst the remote warning device is active, so that a person observing the security screening system is fooled into thinking that it is not operating or has not detected anything.

3. The security screening system according to claim 1 wherein the transmitted signal comprises an electromagnetic or ultrasonic or infra-red signal.

4. The security screening system according to claim 1 wherein the transmitted signal has a relatively short range so that it will alert a nearby guard who is carrying or wearing the remote device, but cannot be detected outside of the range.

5. The security screening system according to claim 1 wherein the remote alert device is a transducer that vibrates when the alert signal is generated to generate a haptic signal.

6. The security screening system according to claim 1 wherein the transmitted signal has a long range to alert a distant guard.

7. The security screening system according to claim 1 which comprises a plurality of a detector apparatus, each of which comprises at least one magnetic sensor arranged to produce a signal indicative of an ambient magnetic field or gradient over a zone of sensitivity around the sensor, the zone being large enough to contain the whole body of the person, and a signal processing circuit which receives as an input the signal from the magnetic sensor and which, in response to a change in the signal produces an alert signal;
   and in which each detector apparatus includes a transmitter that transmits a non-visible and non-audible warning signal when the alert signal is produced, and further comprising:
   at least one camera that captures images of the area including the detector apparatus or a region adjacent the apparatus in which a person approaching, within or having passed through the zone of sensitivity may be located,
   at least one display monitor on which the images captured by the camera can be displayed, and
   a controller that is responsive to the remote alert signal to cause the image from the camera associated with the detector apparatus that has generated the alert to be displayed on the monitor.

8. The security screening system according to claim 7 further comprising a camera for each detector apparatus, each camera capturing an image of a region adjacent the apparatus in which a person approaching, within or having passed through the zone of sensitivity may be located.

9. The security screening system according to claim 7 in which the camera comprises a video camera and the camera and monitor that form part of closed circuit television security system.

10. The security screening system according to claim 7 wherein the detection apparatus is configured to transmit an alert signal through a CCTV system.

11. The security screening system according to claim 7 wherein the camera has sensitivity to the near infra-red and the detector apparatus includes a visual warning beacon that includes infrared LEDs to be lit so as to emit an infrared light alert signal.

12. The security screening system according to claim 7 wherein the detection apparatus includes a near-ultrasonic transmitter that transmits the alert signal, i.e. 20-22 kHz, which is just beyond the maximum hearing range for a human and associated with each detector apparatus is a microphone that can hear such an alert signal.

* * * * *